United States Patent [19]

DeLange

[11] Patent Number: 5,040,827
[45] Date of Patent: Aug. 20, 1991

[54] METHOD AND APPARATUS FOR IMPROVED OILFIELD CONNECTIONS

[75] Inventor: Richard W. DeLange, Houston, Tex.

[73] Assignee: Tubular Technology, Inc., Lafayette, La.

[21] Appl. No.: 547,297

[22] Filed: Jul. 3, 1990

[51] Int. Cl.$^5$ .............................................. F16L 35/00
[52] U.S. Cl. ....................................... 285/18; 285/93; 285/333; 29/407; 33/833
[58] Field of Search ................... 285/93, 18, 333, 334, 285/335, 390; 166/64, 66.5, 66, 77.5, 53; 411/116; 364/561, 562; 33/832, 833, 836, 837, 838; 29/407, 456, 428

[56] References Cited

U.S. PATENT DOCUMENTS

| | | | |
|---|---|---|---|
| 3,468,563 | 9/1969 | Duret | 285/334 X |
| 4,127,927 | 12/1978 | Hauk et al. | 285/93 X |
| 4,908,927 | 3/1990 | Goward | 29/407 |

Primary Examiner—Dave W. Arola
Assistant Examiner—Heather Chun
Attorney, Agent, or Firm—Pravel, Gambrell, Hewitt, Kimball & Krieger

[57] ABSTRACT

An improved method of making up a pressure sealing threaded connection for oilfield country tubular goods is provided. A threaded connection is of the non-shouldered type, and includes a pin member having an external tapered thread and a box member having an internal tapered thread. The actual pitch diameter of the pin thread and the box thread are measured and preferably recorded on the outer cylindrical surface of each respective member. An indicator is positioned on the pin member at a preselected location with respect to the pin face end surface. The pin member and box member are made up to form the threaded connection, while the position of the box face end surface is monitored. Make-up of the connection is terminated in response to this position and as a function of the recorded deviations on the pin and box members. In one embodiment, a hold down block is temporarily secured to the pin member, and a measuring probe supported by the hold down block is positioned such that its free end is directed toward the pin face end surface. A gage is used for determining a baseline reading position of the probe with respect to the pin face end surface. A computer is provided for comparing the position of the box face end surface with respect to the baseline reading position during make up of threaded connection. The method and apparatus of the present invention may be easily and reliably used to provide a highly reliable fluid-tight connection for non-shouldered threads of oilfield tubulars, including API threaded connections.

18 Claims, 2 Drawing Sheets

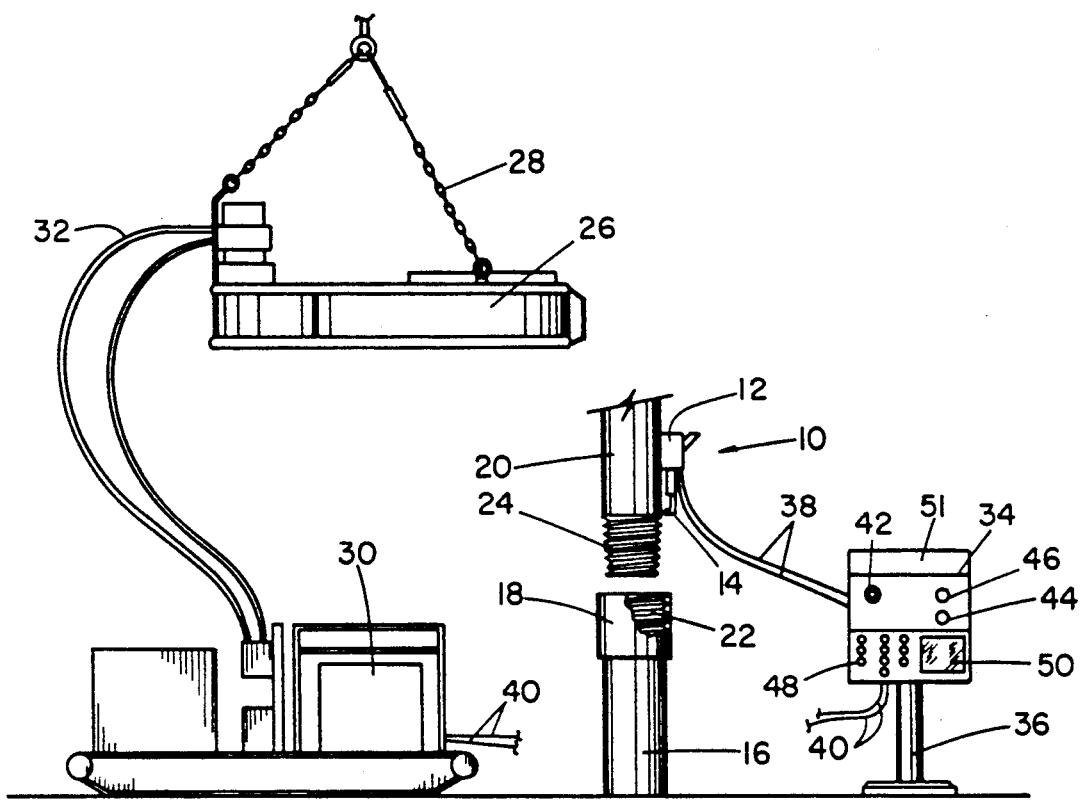
FIG. 1
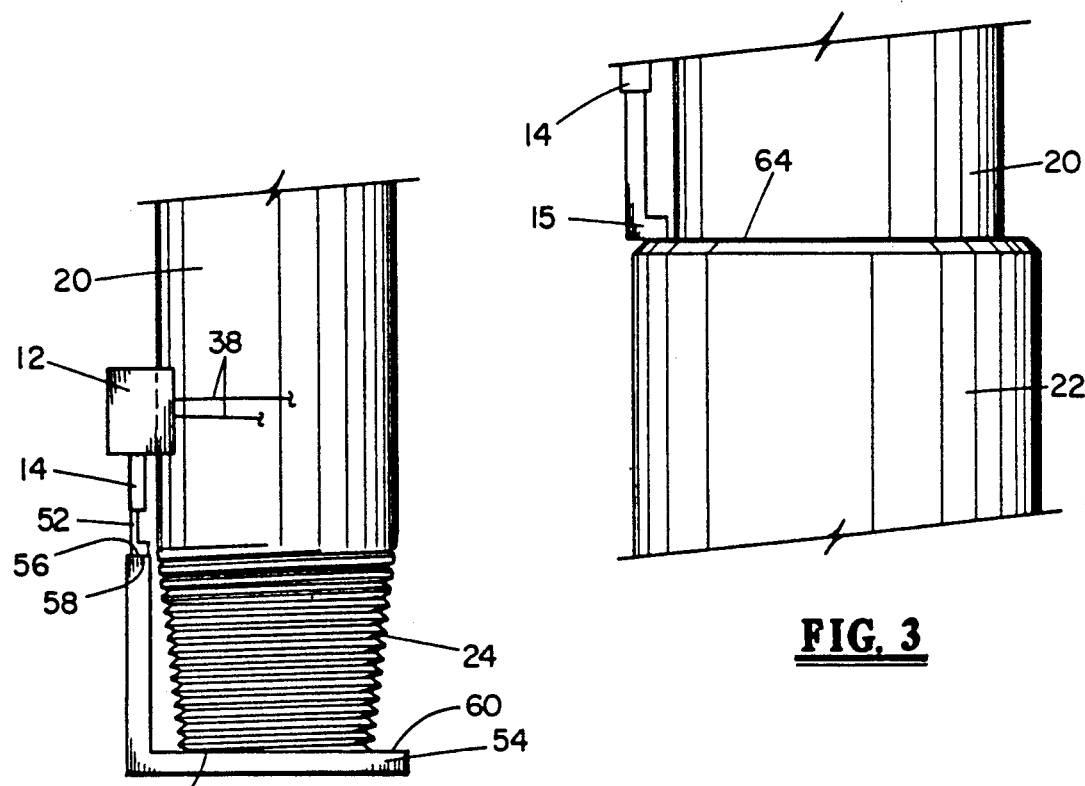
FIG. 2
FIG. 3

METHOD AND APPARATUS FOR IMPROVED OILFIELD CONNECTIONS

Background of the Invention

1. Field of the Invention

The present invention relates to techniques for making up non-shouldered threaded connections for oilfield country tubular goods, and, more particularly, relates to improved methods and apparatus for insuring reliable pressure sealing for non-shouldered threaded connections manufactured according to relatively broad tolerances.

2. Description of the Background

Threaded connections for oilfield tubular goods (OCTG connections) can be generally characterized in one or two classifications (1) low cost threaded connections manufactured according to established API specifications, and (2) high cost or premium connections manufactured according to relatively stringent tolerances. The latter category includes numerous types of connections which typically have at least one "make up" shoulder, which limits the torqued rotation of the threaded male/female members. These premium connections typically also include tapered sealing surfaces which help to ensure that a reliable pressure seal between the male and female members has been obtained. Although a great deal of time and energy has been expended in the last three decades to further improve premium connections, the lower-cost API connections are still widely used in the oilfield, particularly in recent years during which increased emphasis has been placed on the cost of equipment used to recover oil and gas from subterranean formations.

A primary reason for the advancement of premium thread technology relates to the rather broad tolerances allowed by API for an externally threaded pin and an internally threaded box or coupling to comply with API thread specifications. This broad tolerance allows pins and couplings to be made up or threaded together in a manner whereby the rig hands believe that a proper pressure sealing connection has been made, when in fact the interference between the threads was insufficient to establish a fluid-tight connection once the tubular string was subject to high pressure. The resulting loss of fluid pressure and the inability of API connections to insure reliable sealing thus contributed to the long-standing belief that API connections were inherently unreliable for oilfield operations. To further complicate matters, many OTCG connector manufacturers did not always comply with API specifications, although the connections may have been checked or gaged and incorrectly determined to be in conformance with API specifications.

The standard technique for gaging API connections is to utilize a ring and plug gage. The ring gage is screwed onto the pin (and the plug gage similarly screwed onto the box or coupling), and a measurement taken from the pin or coupling face to the gage. The allowed tolerance for the thread pitch diameter was thus expressed in inches of "standoff" from the pin or coupling face to the gage reference point. These API gages are expensive and suitable for checking only a specific sized connection. Moreover, this gaging techniques tends to cause API threaders to manufacture pins small and boxes large, because roundness, lead or taper irregularities in the threads will cause the gage to indicate an acceptable standoff even though the actual thread pitch diameter is outside the allowable range. This bias in the API threading technique thus further increases the tendency of the threaded API connections to fail when subject to high internal tubular pressure.

Due to problems associated with API gaging practices, some companies have checked API threads with "proprietary" gages, which measure the actual diameter of the threads. These proprietary gages do not screw onto the threads, are not affected by the roundness of the threaded connection, and may be used to check a variety of thread sizes.

Regardless of the gaging technique utilized, API connections have a wide range of thread interference when made up to visual make-up marks on the tubular goods. A rig hand may be instructed to make up the API connections so that the box face will be axially aligned with the "last thread scratch" on the pin. This last scratch is, however, very difficult to visually detect with accuracy. Moreover, the "last scratch" does not correctly indicate the point of desired interference between the threads. If the thread is made up to far, it cannot be easily and reliably backed-out to its proper position. Manufacturers of API buttress threads employ a make-up diamond or other marking on the pin to be used as a "bench mark" to determine if the connection is properly made up. Some operators may instruct rig hands to make up a connection a certain number of turns past this make-up diamond. This mark is also difficult to detect, since the mark can be easily covered by the box during the make-up operation. Also, make up of the thread may have to be halted so that excess lubricant can be wiped clean for the rig hand to locate the make up mark, and this make up interruption alters the friction factors between the threads and undesirably increases galling of the threads. Also, the wide tolerance range allowed by this bench mark inherently leads to a great deal of subjectivity with respect to the proper make up position. Most importantly, neither the last scratch nor the bench mark technique provides a system which accurately positions the box member with respect to the end face of the pin, and the make up technique cannot be any more precise than the imprecise technique used to position the mark on the tubular goods.

The above problems have long been recognized in the industry, and accordingly many attempts have been made to improve the pressure sealing ability of API connections. Unfortunately, most of these techniques have met with limited success, in part because of a significantly increase in the cost of manufacturing the connection and/or the cost and time required to perform the make up operation. One technique involves the machining of a groove in the box to accommodate a polymer seal ring. Such a groove and seal ring adds considerably to the cost of the threaded connection, and creates a need for additional parts to be shipped to the rig site where the connections are made. Also, the inclusion of the seal groove generates considerable stress in the connection, which may be detrimental to the long term reliability of the tubular string, particularly when subject to corrosive environments.

Another technique to improve the sealing ability between API connections utilizes a lubricant with a sealing material, such as Teflon bits, incorporated into the lubricant, or uses a lubricant which hardens over a period of time. Both of these techniques are designed to block the escape path of the high pressure fluid to prevent leakage past the connection. These techniques do not substantially increase the cost of the connection, but do require the rig crew to be educated to the sealing technique, and can be significantly effected by various rig environments. For example, when drilling mud is back-flowing up through the tubular as it is run into the well, the mud can prevent the proper application and/or curing of these lubricants. Also, the ability of the connection to better withstand high pressure can be improved by specifying tighter tolerance for the connection, although this approach again increases the cost of manufacturing the tubular connections and does not guarantee that the connection is going to be properly made up at the rig site.

In recent years, various techniques have been designed to measure the torque and turns on the connection to improve the sealing ability of API threads. Such a torque/turn technique may be computer monitored during the make up operation, so that the tong which controlled the make up was deactivated in response to the torque/turn system. This technique considerably increases the cost of the equipment at the well site, and generally requires the use of highly trained personnel. Moreover, the scheduling of torque/turn personnel has to be arranged with other equipment and procedures involved in running tubulars into a well, which may therefore delay the drilling or hydrocarbon recovery operations. Although the torque/turn technique is widely used, it is sensitive to friction, lead, taper and shape of the thread, and to environmental factors unique to the well site, such as rig alignment and crew education.

An article in the October 1989 Petroleum Engineer International magazine discusses some of the disadvantages of using the "last scratch" technique for making up API connections. The article discloses that the actual tolerances for threads according to API gaging techniques varies more widely than had been recognized by many people in the art. The article suggests gaging each pin and box with a proprietary gage, and writing pitch diameter error on the actual pin or coupling measured. When the connection is made up, the tong operator may make a mental calculation to determine how much extra connection rotation is required based upon the mismatch between the undersized pin and the oversized box. Although the last page of the article suggests a matrix to simplify the tong operator's calculation, the proposed technique has not been widely accepted in the industry. In particular, it is believed that oilfield operators recognize that tong operators are frequently too busy with other tasks to utilize mismatch dimensions or a matrix. It is difficult for a tong operator to determine with precision the number of "extra turns" which have occurred, and the suggested technique is not sufficiently simple and reliable to be accurately and reliably used by tong operators.

U.S. Pat. No. 4,127,927 discloses a different technique for making up API threads of oilfield tubular goods. This patent recognizes the advantages of the standard and established API threads, and the API standards discussed therein are hereby incorporated by reference. This patent proposes using ring and plug gages rather than the "proprietary" gages which actually measure pitch diameter. According to the disclosure of this patent, reference lines may be applied on the outer diameter of the tubular goods using the ring and plug gages to locate these lines. Accordingly, a line would be placed on the outer diameter of the pin as a function of the gaging technique, and the position of the reference line with respect to the face end of the pin would thus vary from one pin to the next pin. The patent suggests that the coupling could be made up so that the coupling face was always at a predetermined position with respect to the reference line on the pin. Accordingly, a make up card with a single wide slot is used, and the reference line on the pin can be monitored with respect to the coupling during the make up process. The technique disclosed in this patent likewise has not been widely accepted in the industry, in part because it utilizes the API gaging technique and, therefore, does not insure that API connections are made up with the interference which will reduce or eliminate the liklihood of pressure seal loss through the threaded connection.

The disadvantages of the prior art are overcome by the present invention, and improved methods and apparatus are hereinafter disclosed for reliably making up an oilfield country tubular goods connection which will achieve the desired interference between the pin and box threads during the make up operation and reduce or eliminate the pressure seal loss.

SUMMARY OF THE INVENTION

According to the method of the present invention, the actual pitch diameter or other major dimension diameter of each pin and box thread is measured using a prior art gage. The measured value is compared to the optimum or "no variation" dimension for that sized threaded connection, and the variance is recorded, preferably directly on the outer diameter of the tubular adjacent the thread. Accordingly, the pin may be measured and a value of −2.5 written on the outer diameter of the tubular to indicate that the pitch diameter of the pin is 2.5 thousandths of an inch under the optimum value. Similarly, the pitch diameter of the box may be measured and a value of +1.5 written on the outer diameter surface of the box. These measurements are preferably taken and recorded on the tubular members at a location remote from the rig site, and the recorded values remain affixed to the tubular goods regardless of where they are shipped.

The recorded dimensional variations are used for a particular pin and box combination to determine the axial position of that pin with respect to that box which will obtain the ideal thread interference which will result in high pressure sealing performance for that connection. According to one embodiment, a magnetic hold-down device is locked to the outer diameter of the tubular connection at an imprecise distance, preferably at least several inches from the last scratch on the pin. The position of the hold-down device with respect to the end or face of the pin is thus fixed. A spring loaded controller is secured to the hold-down device, with its probe directed to the end face of the pin. A gaging block is then pressed against the pin face and engages the probe, at which time the controller may be "0 set" at a control panel. This procedure basically ensures that the end of the probe will be at a fixed distance with respect to the end face of the pin whenever the control readout indicates zero. The gaging block may then be removed, and the recorded variations on the pin and box input to the control panel. Based on the previous example, the input value of −1.0 would be used representing the difference between −2.5 and −1.5. The connection would then be made up in a conventional manner, and the panel would display the changing position of the probe as it is moved during make-up by engaging the end face of the box. When this value reached the selected input value of −1.0, a signalling device could be activated, or the power to the tong automatically terminated.

Under an alternate embodiment, a reference line could be scribed on the outer diameter the tubular member several inches from the last scratch on the pin, with a reference line being at a fixed position with respect to the end face of a pin. A template could then be used to achieve the ideal make up position of the pin with respect to the box, and rotation of the connection terminated once the scribe line corresponded with an appropriate marking on the template coinciding to the sum of the recorded gage variations.

It is an object of the present invention to provide an improved technique for determining the optimum make up of oilfield tubular pin thread with respect to an oilfield tubular box thread.

It is a further object of the present invention to achieve the optimum interface between non-shouldered threads of oilfield tubulars in a manner which eliminates subjective judgment to determine the best axial position of a pin with respect to the box.

It is a further object of the invention to provide a relatively simple and low cost technique which may be economically used to obtain optimum pressure sealing performance between the threads of low cost oilfield tubular connections.

It is a further object of the invention to provide apparatus for reliably making up a pin and box connection in a manner which does not require a highly skilled or specially trained rig crew.

It is a feature of this invention that a controller be temporarily secured to the pin, and a baseline reading for the controller established when the end of the controller probe is a preselected distance from the end face of the pin. Threading at the connection causes the box end face to engage the end of the controller probe, thereby changing the output from the controller. Torqued rotation of the connection may be terminated when the controller outputs a value corresponding to the sum of the recorded pin and box thread pitch diameter variations.

It is also a feature of the present invention that a scribe line be placed on a tubular member a selected distance from the end face of a pin, and the pin rotated with respect to the box until the end face of a box reaches a particular position with respect to the scribe line as a function of the gaged diameter of the pin and box connections.

It is an advantage of the present invention that the operation of the tong may be substantially terminated when the threaded connection has reached its optimum interference based upon the recorded pin and box thread pitch diameter variations.

It is another advantage of this invention that the techniques and apparatus are low cost and do not require highly skilled or specially trained personnel to achieve a reliable API thread connection for oilfield goods.

These and further objects, features, and advantages of the present invention will become apparent from the following detailed description, wherein reference is made to the figures in the accompanying drawings.

Brief Description of the Drawings

FIG. 1 is a simplied pictorial view of an oilfield country tubular connection being made up in accordance with one embodiment of the present invention.

FIG. 2 is a more detailed pictorial view of one embodiment of measuring device positioned by a gage with respect to the pin face end surface of a tubular member.

FIG. 3 is a detailed pictorial view illustrating a portion of the measuring device shown in FIG. 2 in engagement with a box face end surface of a threaded connection.

DETAILED DESCRIPTION OF PREFERRED EMBODIMENTS

Figure 4:
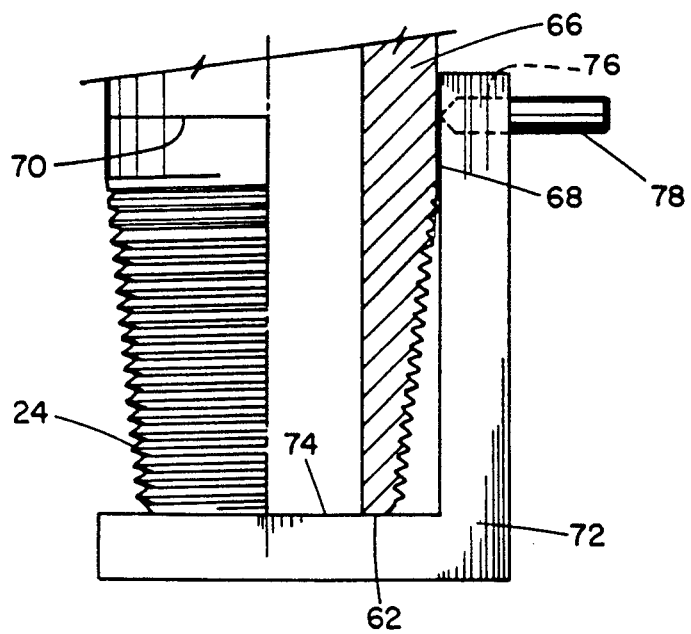
FIG. 4 is a half-sectional view of a pin member including a scribe line and a gage for forming the scribe line in accordance with another embodiment of the present invention.

FIG. 1 illustrates suitable apparatus 10 according to the present invention for making up a threaded connection from oilfield country tubular goods, with the apparatus 10 including a hold down device 12 and a measuring probe 14 discussed below. Those skilled in the art appreciate that the connection is being made up at the rig site utilizing suitable make up and break out equipment. FIG. 1 depicts a length of a tubular 16 extending through the rig floor, with coupling 18 threadably connected to tubular length 16. Another length of tubular 20 is positioned above coupling 18 by suitable equipment (not depicted) and aligned for threaded engagement with the coupling 18. Each end of the tubular 16, 20 is provided with a pin member having an external tapered thread 24 extending axially from a pin face end surface to a "last scratch" on the pin member, and each tubular 16, 20 is typically 20 feet in length or more. Similarly, the coupling 18 includes a pair of box members each having an internal tapered thread 22 extending from a respective box face end surface to a last scratch on the box member.

The tubular connection depicted in FIG. 1 is an API connection and accordingly does not employ a shoulder on the pin member and a corresponding shoulder on the box member to fix the rotation of these members during make up of the connection. The connection is made up in a conventional manner utilizing a tong 26 suspended by chains 28 or other suitable means. Tong 26 in turn is powered by portable hydraulic unit 30, and a pair of hydraulic lines 32 extend from the unit 32 to the tong 26 to rotate the tong cage plate and thus the tubular member 20 to make up the API connection.

A supply of conventional API tubular pin members and couplings may be brought to a rig site to makeup a tubing string of a predetermined length. Prior to the connections being made up, the actual pitch diameter of each pin thread and the actual pitch diameter of each box thread is measured utilizing a conventional "proprietary" gage. Each of these measurements may be taken in a manner well known in the art and described, for example, in the Petroleum Engineer article referenced earlier. The optimum or "exact dimension" pitch diameter for each of these threads is known for each tubular utilizing readily available charts. The measured pitch diameter is then compared to the optimum pitch diameter, and the variance (undersized or oversized) of the actual threads recorded. Preferably these measurements take place at a location remote from the rig site, and preferably at the threading facilty. The variance may be recorded as a plus or over optimum dimension, or a minus or under optimum dimension, in thousandths of an inch, and ideally is recorded directly on the outer cylindrical surface of the pin or coupling at a location adjacent the measured thread. In this manner, the recorded variance inherently is part of each pin and box member which make up each coupling.

Referring now to FIG. 2, just prior to making up the connection as shown in FIG. 1 the magnetic hold down device 12 may be temporarily secured to the pin member 20 at a location above the last scratch on the thread. Precise location of the hold down device 12 is not required, although the hold down device is positioned at least several inches above the last scratch on the thread. Once secured to the pin member, the position of the hold device remains fixed until it is removed from the pin member.

The dimensional indicator 14 is supported by the hold down device, and includes a probe 52 having a free end 15 directed toward the end face surface 62 of the pin member 20. In L-shaped gage 54 is placed against the pin end face 62, so that the upper surface 56 of the gage engages the end surface 58 of the probe 52, thereby positioning the end face of the probe a fixed distance from the pin face end surface 62. Normally this fixed distance will position the end of the probe at the desired position of the end face of the coupling if the threads on the pin and the threads on the box did not deviate from the predetermined optimum pin thread pitch diameter and box thread pitch diameter, respectively.

Once the probe 52 has been positioned by the gage 54, a base-line indication for the dimensional indicator 14 may be obtained. Preferably this is accomplished by "zeroing" the dimensional indicator 14, so that the output from the indicator 14 will thereafter read "zero" only when the probe 52 is at the baseline position established by the gage 54. Once the indicator 14 has been zeroed, gage 54 may be removed and the pin to box connection made up. Although the installation of the hold down device and indicator, and the zeroing of the indicator, have been described in detail above, it should be understood that this procedure would normally take a relatively inexperienced rig hand less than 60 seconds.

Referring to FIG. 1, it should be understood that the holddown block 12 and indicator 14 may be "hard wired" to the control panel 34 provided on base 36. The wiring 38 may thus provide the electrical power to actuate the magnets within the hold down device, power the indicator 14, and relay the output from the indicator to the control panel. The panel 34 includes a plurality of numeric input keys 48, a zero setting button 42, a green light 44, a red light 46, and a numerical display panel 50. The indicator 14 may thus be "zeroed" by the operator simply striking the button 42 when the gage 54 is in the position as shown in FIG. 2. After zeroing the indicator and removing the gage 54, the biased probe 52 will extend toward the pin end face. The variation recorded on the pin and box numbers for this connection may then be input to a microprocessor or computer 51. The computer 51 caculates the difference between the recorded variations and determines from this difference the preferred position of the coupling 18 with respect to the pin end face 62. For example, if the pin variation was −2.5 and the coupling variation was −1.5, the computer may determine that the end face 64 of the coupling and thus the end face 58 of the indicator should be 0.002" above the 0 setting position (0.002" closer to the hold down device 12 than the position shown in FIG. 2). Similarly, if the pin variation was −1.8 and the box variation was +4.2, the computer 51 would calculate the difference between these variations (−5.0) and determine, for example, that the end face 64 of the coupling should be 0.010" above the position as shown in FIG. 2.

FIG. 3 thus indicates a pin member 20 connected to a coupling 22, with the coupling end face 64 in engagement with the free end 15 of the probe for the dimensional indicator 14. Using the latter of the above examples for purposes of further explanation, the readout panel 50 may display an irrelevant fully extended probe position (e.g., −12.2) until the end face 64 of the coupling engages the free end 15 of the probe, after which time the continued axial movement of the pin member with respect to the box member will cause the display on the panel to decrease toward zero, pass through zero, then increase as a positive number. During this time interval, the red light 46 may be activated, indicating to the operator that the connection had not yet been made up to its desired position to maximize thread interference and prevent leaking. After passing through the zero value and reaching +10.0, the red light may be automatically turned off and the green light turned, indicating that the coupling end face 64 was 10.0 thousandths of an inch above the zeroed position. At this instant, the computer 51 may forward a signal through control wiring 40 to the power unit 30 to automatically terminate power to the tong and thus terminate rotation of the pin member. Using the earlier example where the variation sum was −1.0, the display panel would pass through the zero reading and begin to read a positive number. Once this number reached the calculated value of +2.0, indicating plus 2 thousandths of an inch above the zero setting, the green light 44 may be activated simultaneously with the termination of power to the tong 26.

Those skilled in the art will appreciate the computer 51 may be used to terminate power to the tong at a selected axial dimensional value or time period prior to the indicator 14 actually indicating the desired value on the panel 50. If it is known, for example, that the tong will rotate the pin member a certain axial amount after the terminating signal to the power unit 30 is received, the computer logic may generate the termination signals so that the fixed position of the pin member was substantially at its desired position once rotation of the pin member bythetong actually stopped. Also, conventional automatic control valving and/or valving operation by the rig hand may be used to "slow down" the speed of rotating the pin member as the coupling approached its final position. The hold down device 14 is preferrably a magnetic block, and may be of the type 98/6301 commercially available from MITUTOYO. The dimensional indicator 14 including the probe 52 is also commercially available from MITUTOYO, and may be of the type available under Model 529-610.

FIG. 4 illustrates another embodiment of the present invention. For this embodiment, the pitch diameter of the pin threads and the box threads may be measured and recorded as previously described. Prior to making up the connection, and ideally at the threaded facility, a modified L-shaped gage 72 is used to make a scribe line 70 on the pin member 66. Gage 72 includes a line scriber or marker 78 positioned in aperature 76 in the upper portion of the gage. The surface 74 of the gage is placed against the pin end face 62, and the gage rotated (at least 180° and preferably 360°) with respect to the pin member 66 to form a marking or scribe line 70 which will be at a preselected "zero variation" axial position from the pin end face 62. Scribe line 70 is formed on the cylindrical outer surface 68 of the pin above the last scratch of the threads 24, and preferably at least 1" or more above the last scratch of the threads.

Figure 5:
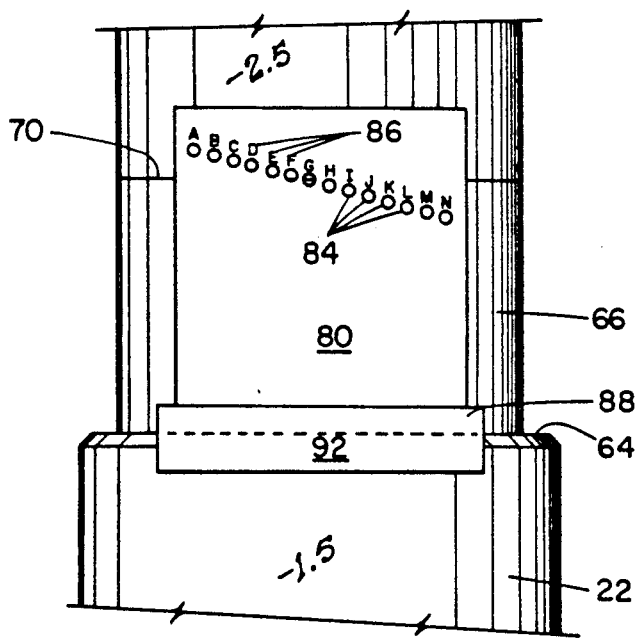
FIG. 5 is a pictorial view illustrating a template suitable for locating the scribe line at a predetermined position with respect to the box face end surface of the threaded connection.
Figure 5A:
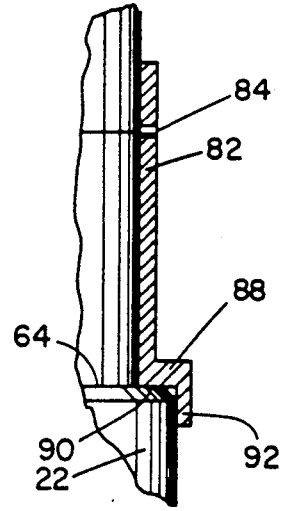
FIG. 5A is a cross-sectional view of the template shown in FIG. 5 positioned with respect to the male and female members of the threaded connection.

When the connection is made up at the well site, a template 80 is used by the rig operator to determine the desired position of the pin member with respect to the box member to achieve a fluid-tight connection. A matrix may be provided the rig operator illustrating a position on the template 80 corresponding to a certain combination of pin and box variations. For example, the rig hand may easily see from the recordings on a particular pin and box number that the pin is $-2.5$ and the box $-1.5$. Using the provided matrix, the rig hand can easily determine that the combination of these pin and box variations corresponds to position "G" on the template 80. Similarly, if the recorded pin variation is $-1.8$ and the box variation is $+4.2$ the matrix may indicate to the rig hand that this combination corresponds to position "B" on the template 80. Template 80 includes a curvilinear plate portion 82 containing a plurality of through aperature 84 each a preselected axial position from the base 88 of the template. Visible markings 86 are preferably provided adjacent and corresponding to each of the through aperatures 84. The base 88 includes a planar surface 90 which engages the coupling end face 64, as shown in FIG. 5A. A base panel 92 may optionally be provided for fitting over a portion of the outer cylindrical surface of the coupling, thereby assisting in positioning the template with respect to the pin member 66.

In operation, the rig hand may determine using the matrix the desired disingation (in the exemplary template 80 discussed above, one of the designations A-N) which corresponds to the final desired axial position of the pin with respect to the coupling for that particular connection. During make up of the connection, the template 80 is positioned against the connection as shown in FIG. 5, and as the connection is made up the scribe line 70 will be visible first through the aperature, A, and then aperatures B, C, D, etc. When the scribe line 70 is visible in the desired aperature G as shown in FIG. 5, the rig hand may terminate further rotation of the pin with respect to the box.

FIGS. 4 and 5 thus depict a threaded connection according to the present invention including the external tapered thread on the pin member and the internal tapered thread on the box member as previously described. As shown in FIG. 5, the pin member includes a pin thread pitch diameter marking representing the deviation between the measured pin thread pitch diameter to the optimum pin thread pitch diameter, as previously explained. Similarly, the box member depicted in FIG. 5 includes a box thread deviation marking on the box member representing the deviation between the measured box thread pitch diameter with respect to the optimum box thread pitch diameter. Finally, a scribe line is provided on the pin member, the scribe line being at a predetermined axial position with respect to the end face surface 62 on the pin member. The markings on the pin and the box members are thus used by the rig hand to determine the preferred axial position of the coupling end face 64 with respect to the scribe line 70. Threads for both the pin member and box member are preferably API threads. In one embodiment, the box member is a coupling having an internal tapered thread at each end thereof, and a pin member provided at one end of a length of tubular goods more than 20' in length.

It should be appreciated that each of the embodiments described above achieves the various objects of the present invention. In particular, the methods and apparatus of the present invention provide an improved technique for determining the optimum make up position of an oil field tubular pin thread with respect to an oil field tubular box thread even through the threads are provided are non-shouldered oil field tubulars. The techniques of the present invention obtain the optimum interference between the threads while eliminating subjective judgment to determine the best axial position of the pin with respect to the box. Each of the embodiments described is relatively simple, and provides a low cost technique which may be economically used to obtain optimum pressure sealing performance between threads of oilfield tubular connections without requiring a highly skilled or specially trained rig crew. The embodiment disclosed in FIGS. 1-3 has the advantage of minimizing the duties of the rig hand at the well site, and may be easily automated to achieve automatic termination of the pin with respect to the box. The threaded connection and template shown in FIGS. 4 and 5 has the advantage of even lower equipment costs, and does not require difficult analysis or subjective determinations by the rig hands of the number of turns the pin has rotated with respect to the box.

Those skilled in the art will appreciate that, although the methods and apparatus of the present invention have been particularly described with respect to a pin member on an elongate tubular and a coupling, the techniques of the present invention may be used for either coupled or pin-and-box connections. Those skilled in the art will also understand that various modifications will be suggested and apparent from the foregoing disclosure. For example, conventional techniques may be used to eliminate the hard wiring between the conventional indicator and the control panel. Similarly, a telemetered signalling system may be used to automatically terminate power to the tong to prohibit further make up of the connection. As a further alternative, it should be understood that a rig hand who controls operation of the tong may manually terminate power to the tong in response to the signal provided by the green light 44, or in response to another suitable signalling device, such as an audible signalling device (not depicted).

The foregoing disclosure and description of the invention are thus illustrative and explanatory therof, and various changes in the size, shape and materials, as well as the details of the illustrated construction and the methods and techniques of the present invention, may be made within the scope of the appended claims and without departing from the spirit of the invention.

What is claimed is:

1. The method of making up a pressure sealing threaded connection for oilfield country tubular good, the threaded connection including a pin member having an external tapered thread extending axially from a pin face end surface to a last scratch thread on the pin member, and a box member having an internal tapered thread extending from a box face end surface to a last scratch on the box member, the method comprising:
   (a) measuring the pin thread pitch diameter for the pin member thread;

(b) recording the deviation of the measured pin thread pitch diameter with respect to a predetermined optimum pin thread pitch diameter;

(c) measuring the box thread pitch diameter for the box member thread;

(d) recording the deviation of the measured box thread pitch diameter with respect to a predetermined optimum box thread pitch diameter;

(e) positioning an indicator on the pin member at a preselected referenced position with respect to the pin face end surface;

(f) making up the pin member and the box member to form the threaded connection;

(g) comparing the position of the box face end surface with respect to the predetermined location of the indicator on the pin member during step (f); and (h) terminating make-up of the connection in response to the comparison of step (g) and determining the position of the box face end surface with respect to the indicator from the deviation recorded in steps (b) and (d).

2. The method as defined in claim 1, wherein steps (b) and (d) each include writing the deviation on an outer surface of the pin member and box member, respectively.

3. The method as defined in claim 2, wherein step (e) comprises:

securing a hold-down block to the pin member;

mounting a dimensional indicator to the hold-down block such that a probe of the dimensional indicator is directed toward the pin face end surface with respect to the hold-down block;

placing a gage simultaneously against the pin face end surface and into engagement with an end surface of the probe; and establishing a baseline indication while the gage is in engagement with the pin face end surface and the end surface of the probe, such that the dimensional indicator outputs the baseline indication when the probe is at the preselected location with respect to the pin face and surface.

4. The method as defined in claim 3, further comprising:

providing a readout indicating the axial position of the probe with respect to its predetermined position with respect to the pin face end surface.

5. The method as defined in claim 3, further comprising:

summing the deviations recorded in steps (b) and (d); and providing a readout indicating the axial position of the probe with respect to the summed deviations.

6. The method as defined in claim 1, further comprising:

making up the threaded connection using a tong powered by a power unit; and step (h) includes automatically terminating power from the power unit to the power tong to terminate make-up of the threaded connection.

7. The method as defined in claim 1, wherein step (e) comprises:

marking a scribe line on an outer surface of the pin member a fixed distance from the pin end face surface.

8. The method as defined in claim 7, wherein step (g) comprises:

providing a template having a plurality of perforations therein each a preselected distance from a base surface of the template;

positioning the base surface of the template against the box face end surface during step (f); and observing the scribe line through one or more of the plurality of perforations.

9. The method as defined in claim 8, wherein step (h) comprises:

summing the recorded deviations;

determining a particular one of the plurality of perforations which corresponds to a summed deviations; and terminating make-up when the scribe line is visible through the determined particular perforation.

10. The method as defined in claim 2, wherein:

the box member is a coupling having an internal tapered thread at each end;

step (c) includes measuring the box thread pitch diameter for each thread of the coupling; and step (d) includes writing the deviation of each thread on the outer surface of the couplings.

11. A threaded connection for oilfield country tubular goods, the threaded connection including a pin member having an external tapered thread extending axially from a pin face end surface to a last scratch thread on the pin member, and a box member having an internal tapered thread extending from a box face end surface to a last scratch thread on the box member, the connection further comprising:

a pin thread pitch diameter marking on the pin member representing the deviation between the measured pin thread pitch diameter with respect to the optimum pin thread pitch diameter;

a box thread deviation marking on the box member representing the deviation between the measured box thread pitch diameter with respect to the optimum box thread pitch diameter; and a scribe line on the pin member, the scribe line being at a predetermined axial position with respect to the end face surface on the pin member, such that the markings on the pin member and box member determine the preferred axial position of the end face on the box member with respect to the scribe line when the connection is made up.

12. The connection as defined in claim 11, wherein the threads on both the pin member and the box member are American Petroleum Institute standardized threads.

13. The connection as defined in claim 11, wherein:

the box member is a coupling having an internal tapered thread at each end thereof; and a pin member is provided at one end of a length of tubular goods more than 20 feet in length and having a pin member of each end thereof.

14. Apparatus for making up a threaded connection for oilfield country tubular goods, the threaded connection including a pin member having an external tapered thread extending axially from a pin face end surface to a last scratch thread on the pin member, and a box member having an internal tapered thread extending from a box face end surface to an internal scratch on the box member, the apparatus comprising:

a hold down block for temporarily securing to the pin member;

a measuring probe supported by the hold down block and positioned with respect to the pin member such that a free end of the measuring probe is directed toward the pin face end surface of the pin member;

a gage for engaging the pin face end surface and the free end of the probe;

zeroing means for determining a baseline reading position of the probe with respect to the pin face end surface;

comparison means for comparing the position of the box face end surface with respect to the baseline reading position location of the probe during make-up of the threaded connection.

15. The apparatus as defined in claim 14, further comprising:

indicating means for signalling that the box end face surface is at the baseline reading position of the probe.

16. Apparatus as defined in claim 15, further comprising:

terminating means responsive to the comparison means for automatically terminating power to a power tong used to make-up the threaded connection.

17. The apparatus as defined in claim 14, further comprising:

a readout unit for indicating the axial position of the probe with respect to the baseline reading position.

18. The apparatus as defined in claim 17, further comprising:

summing means for summing recorded deviations of the pin end pitch diameter and the box and pin diameter; and comparison means for comparing the summed deviations with respect to the measured position of the box face end surface.

* * * * *